US005929378A

United States Patent [19]

Guisti

[11] Patent Number: 5,929,378

[45] Date of Patent: Jul. 27, 1999

[54] DOORBELL BUTTON INTERFACE BOX

[75] Inventor: Gerald G. Guisti, 110 E. Eliot St., Mark, Ill. 61340

[73] Assignee: Gerald G. Guisti, Mark, Ill.

[21] Appl. No.: 08/962,364

[22] Filed: Oct. 31, 1997

[51] Int. Cl.[6] .......... H02G 3/18

[52] U.S. Cl. .......... 174/65 R; 220/3.3

[58] Field of Search .......... 174/48, 50, 53, 174/58, 65 R, 63, 60, 17 R; 220/3.3, 3.4, 3.5

[56] References Cited

U.S. PATENT DOCUMENTS

| | | | |
|---|---|---|---|
| 2,180,598 | 11/1939 | Mahan | 220/3.5 |
| 2,659,765 | 11/1953 | Dunn | 174/65 R |
| 3,168,613 | 2/1965 | Palmer | 174/65 R |
| 3,476,343 | 11/1969 | Burrell | 248/216.4 |
| 4,247,738 | 1/1981 | Bonato | 174/53 |
| 5,306,870 | 4/1994 | Abat | 174/65 R |
| 5,698,820 | 12/1997 | Collard | 174/57 |
| 5,700,977 | 12/1997 | Ford et al. | 174/64 |
| 5,717,164 | 2/1998 | Shetterly | 174/58 |

FOREIGN PATENT DOCUMENTS

| | | | |
|---|---|---|---|
| 620986 | 4/1949 | United Kingdom | 174/50 |
| 1022851 | 3/1966 | United Kingdom | 174/65 R |

*Primary Examiner*—Kristine Kincaid
*Assistant Examiner*—Dhiru R Patel
*Attorney, Agent, or Firm*—Leydig, Voit & Mayer, Ltd.

[57] ABSTRACT

A doorbell button interface box provides a storage space into which a section of doorbell wire many times longer than the dimension of the interface box can be folded in a serpentine manner for use in future repairs of the electrical connection to the doorbell button. The interface box is mounted directly behind the doorbell button in the wall on which the doorbell button is mounted. The interfaces box has an entrance aperture through which the doorbell wire enters the box, and a plastic neck on the front wall of the box through which the wire may be pulled out for making connection to the doorbell button. The plastic neck is sized for receiving the switch of a doorbell button of a standard size for protecting the electrical connection thereto.

9 Claims, 2 Drawing Sheets

47 31 30 48 50B 56 40 42 44 52 16 46 14 47 31 48 50A 50 50 20 18 10

DOORBELL BUTTON INTERFACE BOX

FIELD OF THE INVENTION

This invention relates generally to low voltage electrical wiring in buildings for connecting electrical devices, and more particularly to electrical wiring for the installation of a doorbell button on the exterior of a house.

BACKGROUND OF THE INVENTION

The construction of a modern house requires careful planning and attention to detail for all types of electrical connections such as AC power lines, outlets, switches, phone lines, cables, etc., that are currently needed or will be needed in the future. The electrical wiring in a modern house is typically hidden in the walls, and it is necessary to lay all the electrical connection wires inside the walls during the construction of the walls.

Generally, the wiring for the conventional AC power connections are governed by fairly stringent national standards and construction codes, due to the relatively high voltages and currents involved. The AC power wires are typically strung inside a network of steel pipes and junction boxes disposed in the walls, which supports and protects the relatively thick and stiff AC wires.

In contrast, generally much less attention is given to the electrical wiring for low-voltage appliances, such as telephones and doorbells, that operate on low voltages and low currents. The wiring for such low voltage appliances is separate from the AC power wiring, and typically the low voltage wires are simply strung through the interior of the walls to predefined locations without special provisions for stress relief or extra protection of the wires.

An example of low-voltage wiring is the wiring for a doorbell button. A doorbell button is typically a push-button type electrical switch mounted on a wall adjacent the front door of the house and wired to a doorbell chime inside the house. Since the doorbell button is mounted on the exterior of the house, the doorbell wire has to be passed through the wall in order to make connection to the doorbell button. The doorbell wire typically has relatively thin conductors and relatively thin and fragile insulation as compared to the AC power wires.

It is common that the electrical connection to the doorbell button has to be repaired every five to ten years. The common causes of faulty connection to the doorbell button are oxidation of the conductors and broken insulation on the wire. The conductors of the wire at the connection to the doorbell button tend to oxidize over time and form bad contacts. The insulation on the wire adjacent the doorbell button also tends to deteriorate over time. The deterioration of the wire insulation eventually causes the conductors to be exposed, and the exposed conductors may come into contact with each other to form a short circuit and burn out the door chime.

In either case, the deteriorated end section of the wire has to be cut off and a new connection to the doorbell button has to be made. However, a frequently encountered problem is that after the damaged end section of the wire is removed, there is not enough wire left for making the new connection. This problem is especially significant if the house has brick walls or a brick facade, because in such a case the doorbell wire is typically mortared in the wall between bricks, with only a short end section of the wire extending out of the wall for connection to the doorbell button. If the exposed end section of the wire becomes too short for making a new connection, a portion of the brick wall may have to be removed in order to redo the wiring.

U.S. Pat. No. 3,941,915 to Boghosian discloses a doorbell switch receptacle which has a tubular body with a removable cap on one end and a mounting plate on the other end. The tubular body serves as a conduit for the doorbell wire to pass through the wooden wall on which the doorbell button is mounted. During the construction of the wall, the cap is used as a tie-off point for locating the end of the wire. After the wall is completed, the cap is removed from the end of the tube, and the doorbell button is mounted on the wall with the body of the switch inserted into that end of the tube. Although the doorbell switch receptacle is useful in that it serves as an interface between the doorbell button and the wall on which the button is mounted, it does not provide a solution to the problem of not having sufficient doorbell wire for future repairs as described above.

SUMMARY OF THE INVENTION

In view of the foregoing, it is a primary object of the present invention to provide an effective solution to the problem of not having sufficient doorbell wire available when the doorbell connection has to be fixed, so as to avoid the need to incur significant expenses and efforts to redo the electrical wiring for the doorbell button.

It is a resultant object of the present invention to provide a means for interfacing a doorbell button and the wall on which it is mounted that is simple, inexpensive, yet highly effective in preventing the problem of not having enough doorbell wire for repairing the electrical connection.

It is a related object of the present invention to provide such an interface means that also serves as a locating means for holding the end of the doorbell wire during the construction of the wall.

It is a further related object of the present invention to provide such an interface means that can be used with both brick walls and wooden walls.

In accordance with these and other objects of the present invention, there is provided a doorbell button interface box for use with a doorbell button that provides a storage space in which a significant length of the doorbell wire is stored for use in future repairs. The doorbell button typically includes an electrical switch and a mounting plate. The doorbell button interface box has a hollow body of a generally rectangular shape. The height of the box is preferably similar to the standard thickness of a brick to facilitate the mounting of the box in a brick wall. A hollow plastic neck is attached to the front of the box and communicates with the interior of the box.

The box is mounted in the wall on which the doorbell button is mounted and located behind the doorbell button. The doorbell wire enters the interface box via an entrance aperture thereon and passes through the box via the plastic neck, and the end of the wire is connected to the switch of the doorbell button. The section of the wire adjacent the switch connection is stored in the interface box in a folded, serpentine, manner. In this way, the interface box provides a storage space that is capable of receiving in an unstressed form a "spare" section of the doorbell wire that is many times longer than the dimension of the box and is intended to be sufficient for all future repairs. The plastic neck is sized for receiving the body of a doorbell switch of a standard size such that the electrical connection to the switch is shielded inside the plastic neck.

It is a feature of the present invention that the doorbell button interface box serves multiple interfacing purposes.

First, it is provided as a simple, inexpensive, yet highly effective solution to the common problem of not having sufficient doorbell wire available for repairing the deteriorated connection to the doorbell button. Since a sufficient length of the wire can be stored in the interface box for all foreseeable future repairs, the problem of running out of wire for repairs, which often requires the expensive remedy of tearing down the wall to redo the wiring, is effectively avoided.

The interface box also serves as a locating means for holding the end of the doorbell wire during construction of the wall so that after the wall is completed the end of the wire can be easily accessed for connection to the doorbell button. The plastic neck of the interface box serves as a receptacle for the doorbell switch so that the electrical connection thereto is received in the plastic neck for enhanced protection.

Other objects and advantages will become apparent with reference to the following detailed description when taken in conjunction with the drawings in which:

Figure 1:
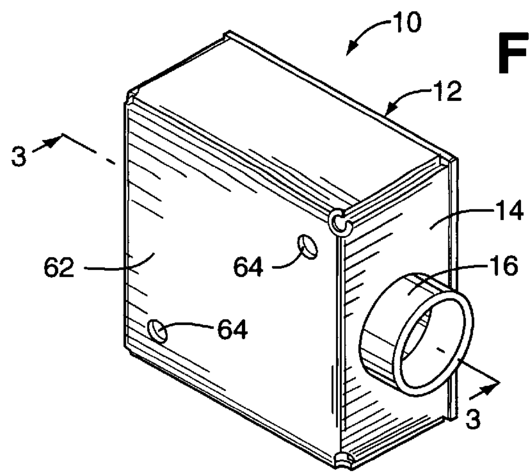
FIG. 1 is a perspective view of a doorbell button interface box embodying the present invention.

While the invention is susceptible of various modifications and alternative constructions, certain illustrated embodiments hereof have been shown in the drawings and will be described below. It should be understood, however, that there is no intention to limit the invention to the specific forms disclosed, but, on the contrary, the invention is to cover all modifications, alternative constructions and equivalents falling within the spirit and scope of the invention as defined by the appended claims.

DETAILED DESCRIPTION OF THE PREFERRED EMBODIMENT

Figure 2:
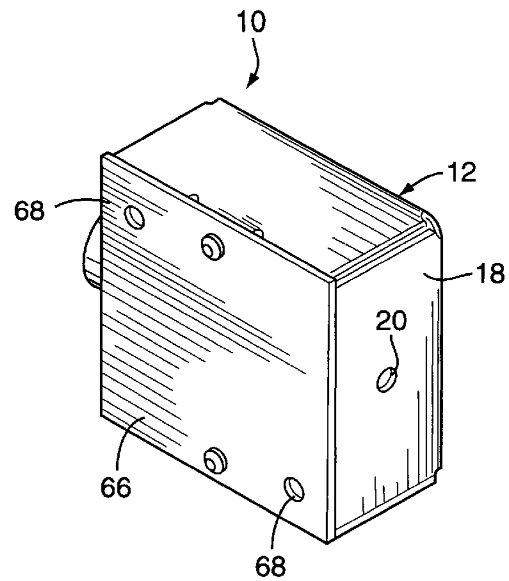
FIG. 2 is a perspective view showing the back of the doorbell button interface box.
Figure 3:
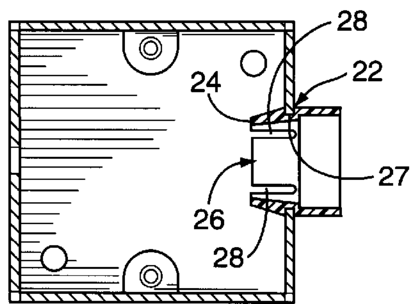
FIG. 3 is a cross sectional view of the doorbell button interface box.

Turning now to the drawings, FIG. 1 shows generally the front and right sides of an embodiment of the doorbell button interface box 10 of the present invention. The interface box 10 has a hollow body 12 of a generally rectangular shape. The front side 14 of the body 12 has an aperture and a hollow plastic neck 16 attached thereto which communicates with the interior of the interface box via the aperture. FIG. 2 shows generally the rear and left sides of the interface box 10. An aperture 20 on the rear wall 18 of the box 10 provides an entrance for a doorbell wire to enter the box. A cross sectional view of the doorbell button interface box 10 is shown in FIG. 3.

Figure 5:
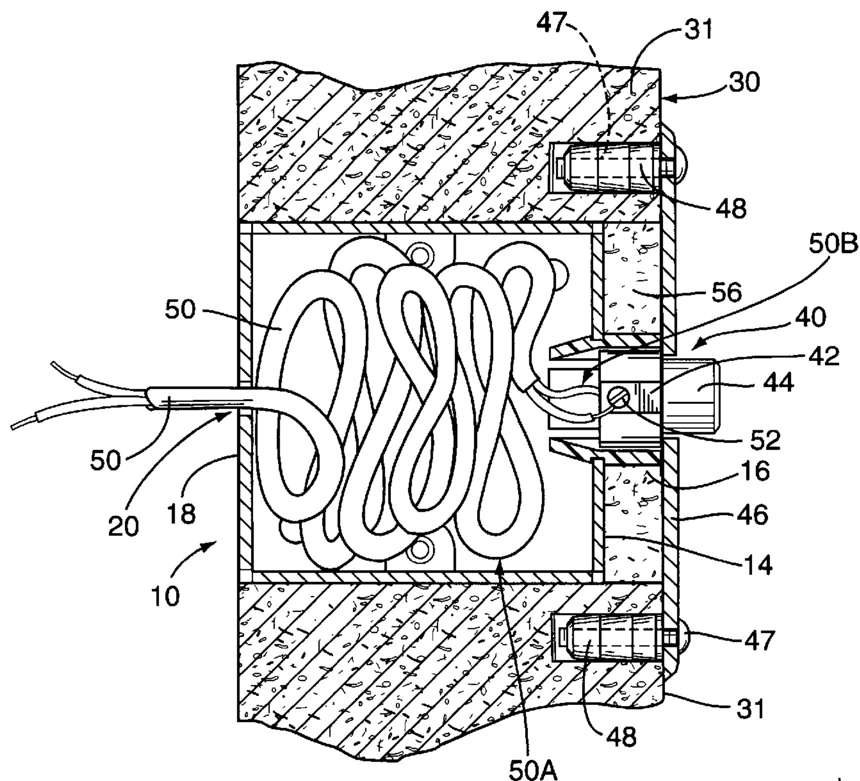
FIG. 5 is a cross sectional view of the interface box along the line 5—5 in FIG. 4.

In accordance with a feature of the present invention, the doorbell button interface box is provided as a simple, inexpensive, yet highly effective solution to the often encountered problem of not having sufficient doorbell wire left when the electrical connection of the wire to he doorbell button has to be repaired. In accordance with the invention, the hollow body 12 of the box 10 provides a storage space into which a sufficiently long section 50A of the doorbell wire adjacent the connection to the doorbell button can be stored in a folded, serpentine, manner as illustrated in FIG. 5. The interface box 10 is capable of receiving a section of the doorbell wire that is many times longer than the interface box, and such a spare section is intended to be sufficient for all anticipated future repairs. In this way, the highly frustrating yet rather common problem of not having enough doorbell wire left for fixing the doorbell connection is effectively avoided.

In the present embodiment, the box 10 is about 2¼ inches long, about 2¼ inches high, and about 1⅛ inches wide. The body 12 of the box is formed of metal, such as steel. Alternatively, the body may be formed of thermoplastic or other materials of sufficient rigidity, impact tolerance, and durability. The entrance aperture 20 on the rear wall 18 of the body preferably has a diameter of about 3/16 inch. The plastic neck 16 on the front wall 14 of the body has a cylindrical shape, with a Length of approximately 5/16 inch projecting from the front wall, an outer diameter of about ⅞ inch, and an inner diameter of about ¾ inch. The neck 16 is preferably formed of high density polyethylene which has adequate rigidity and durability. As can be best seen in the cross sectional view of FIG. 3, the neck 16 is attached to the body of the box 12 by means of a snap-on connection. As illustrated, the neck 16 has a groove 22 on the outer periphery adjacent the end 24 which is attached to the front wall 14 of the box. When the neck 16 is mounted on the box, the groove 22 receives the edge of the, front wall around the aperture 26. To facilitate the snap-on connection, slots 28 are formed in the cylindrical wall of the neck 16 at the end 24 to increase the flexibility of the wall.

Figure 4:
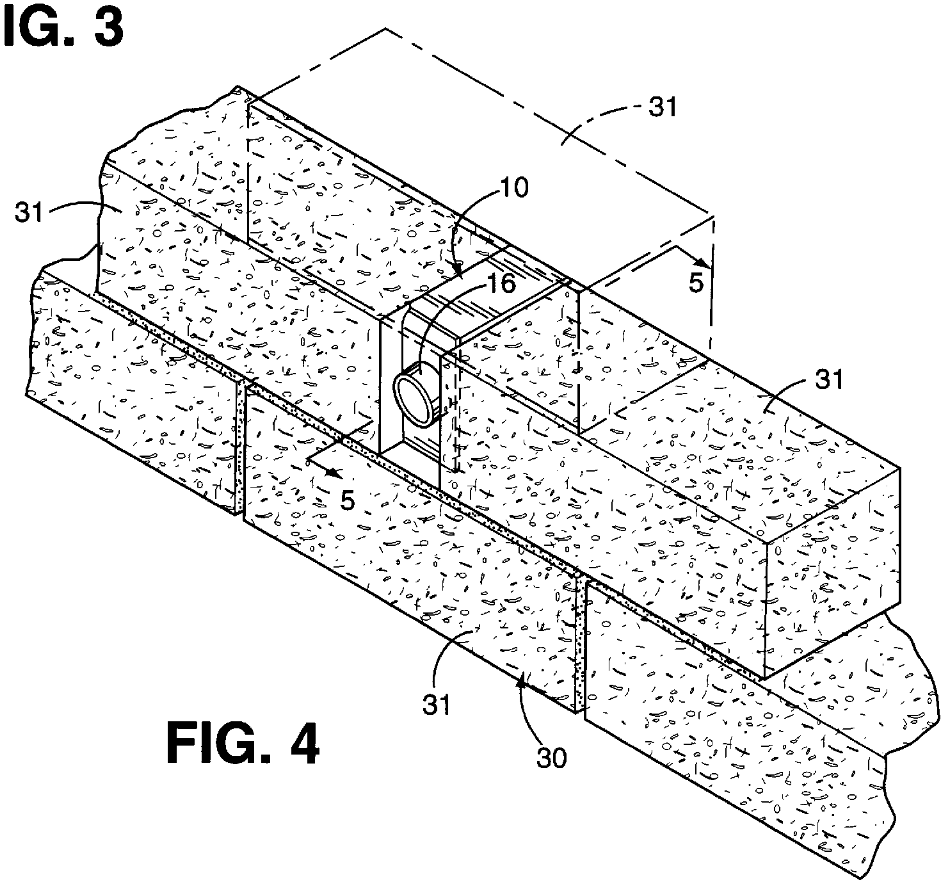
FIG. 4 is a fragmentary perspective view showing the interface box embedded in a brick wall exemplifying the application of the present invention.

The height of the preferred embodiment of the box 10 is dimensioned to be substantially the same as the standard thickness of a brick to facilitate the installation of the box in a brick wall. FIG. 4 shows the interface box 10 mounted in a brick wall 30. As illustrated, the box 10 is embedded in the brick wall 30 between bricks 31. Preferably the box is mounted such that the front edge of the plastic neck 16 is about flush with the front surface of the brick wall 30. Because the height of the box 10 is about the same as the thickness of the bricks 31, the box can be directly mortared in the wall 30, as illustrated in FIG. 4. In order to preserve the pattern of the brick wall 30, preferably one of the bricks 31 on the two sides of the box has its length reduced by about the width of the box to accommodate the box.

FIG. 5 shows a cross sectional view of the interface box 10 mounted in the brick wall 30. Also shown is a doorbell button 40 of a very common type mounted on the exterior surface of the brick wall 30. The doorbell button 40 has an electrical switch 42 for controlling a door chime in the house, and a push-button 44 for actuating the electrical switch. As is typical, the doorbell button 40 includes a mounting plate 46 for supporting the switch 42. In the illustrated embodiment, the mounting plate 46 is mounted on the outer surface of the brick wall 30 by means of screws 47 and anchors 48 inserted into the bricks 31. As is also typical, the switch 42 has a generally cylindrical body with a diameter of about ⅝ inch. The switch 42 includes means for connecting the conductors of the doorbell wire 50 to the switch. As illustrated, the connecting means includes screws 52 mounted on the cylindrical body of the switch 42, and the areas on the cylindrical body where the screws are mounted are recessed to accommodate the electrical connection so that after the connection is made the screws 52 do not protrude beyond the cylindrical boundary defined by the diameter of switch body.

Preferably, the box 10 is mounted in the wall 30 directly behind the doorbell button 40. The height and width of the box 10 are preferably such that the front wall 14 of the box is smaller than the mounting plate 46 of the doorbell button 40. Thus, when the doorbell button is mounted on the wall, the opening 56 in the wall for accommodating the box is covered by the mounting plate. If the mounting plate 46 is smaller than the front face of the doorbell box 10, the opening 56 may be filled with mortar so that only the opening of the neck 16 is exposed.

Alternatively, instead of reducing the length of a brick 31 to form the opening 56 for receiving the doorbell box, a brick 31 ray be cut in such a way to remove a rear corner portion to provide a space for receiving the box 10, and to form a slot in the front surface of the brick through which the neck of the box may extend to the exterior of the wall. In this way, the doorbell box is generally hidden behind the brick.

In accordance with other feature of the present invention, the interface box provides a receptacle for the push-button switch 40. In the preferred embodiment, the plastic neck 16 is sized to have an inner diameter similar or slightly larger than the diameter of the switch to provide a snug sliding fit to the cylindrical body of the switch. The doorbell button 40 is positioned on the wall su(h that the body of the switch 42 with the electrical connection thereon is received in the plastic neck 16. Thus, the electrical connection to the switch is shielded by the plastic neck from the surrounding environment.

As illustrated in FIG. 5, a significant length of the doorbell wire 50 is stored within the box 10. The doorbell wire 50 is folded inside the box in a serpentine manner. The wire 50 enters the box through the aperture 20 on the rear side of the box. The end of the wire 50 is connected to the switch 42 of the doorbell button. When the connection to the switch 42 has to be replaced due to oxidation or broken insulation, the end section 50B of the wire 50 is clipped off, and a length of the wire stored in the box 10 is pulled out of the box for forming the new connection to the doorbell button. Because the doorbell wire 50 is relatively thin and flexible, the box 10 is capable of storing a sufficient length of the wire which is intended to be enough for all future repairs in the entire lifetime of the house.

Figure 6:
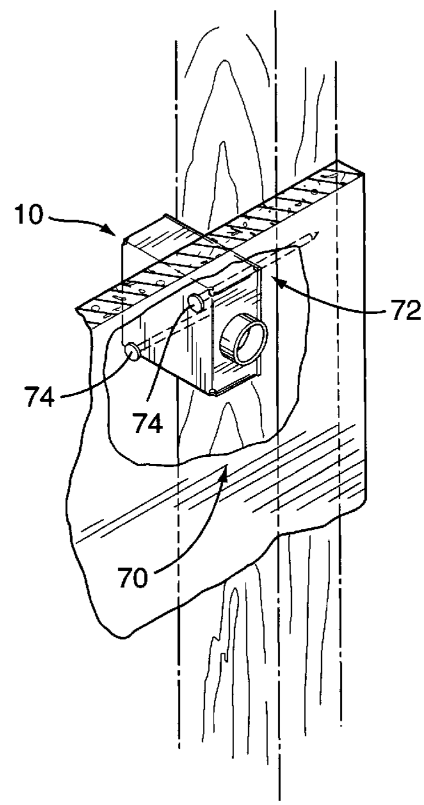
FIG. 6 is a fragmentary, partially cut-away perspective view showing the interface box mounted in a wooden wall exemplifying the application of the present invention.

The doorbell button interface box 10 of the present invention is also usable with doorbell buttons mounted on wooden walls. As illustrated in FIGS. 1 and 2, the right side wall 62 has nail holes 64 therein. The left side wall 66 has nails holes 68 matching those on the right wall so that nails can be passed through the interface box 10 via the nail holes 64, 68. FIG. 6 shows the box 10 mounted inside a wooden wall 70. For illustration purposes, a portion of the exterior surface of the wall 70 is cut away to reveal the interface box 10. As illustrated, the interface box 10 is mounted on a stud 72 in the wall. Two nails 74 are passed through the box 10 via the nail holes and driven into the stud 72, thereby securing the box on the stud. Preferably the box 10 is mounted directly behind the location of the doorbell button on the wall such that the body of the switch is received in the plastic neck of the box.

In accordance with a further feature of the present invention, the interface box 10 also serves as a locating means for reliably holding the end of the doorbell wire during the construction of the wall on which the doorbell button is mounted. When the construction of the wall has reached an appropriate point, the interface box 10 is installed in the wall in the manner illustrated in FIG. 4 for a brick wall and in the manner illustrated in FIG. 6 for a wooden wall. After the doorbell wire is installed inside the uncompleted wall between the interface box 10 and the position where the doorbell chime will be installed, the wire is passed into the interface box 10 and stored therein in the manner illustrated in FIG. 5, with the end of the wire extending to the exterior of the wall through the plastic neck 16 of the box. In this way, the interface box 10 securely holds the end portion of the wire, thereby preventing the wire from disappearing inside the wall during or after the completion of the wall. Since the end of the wire extends to the exterior of the wall, it can be easily located later for electrical connection to the doorbell button. After the end portion of the wire is stored in the interface box, the wall is completed, and the doorbell button is connected to the doorbell wire and mounted on the wall.

Figure 7A:
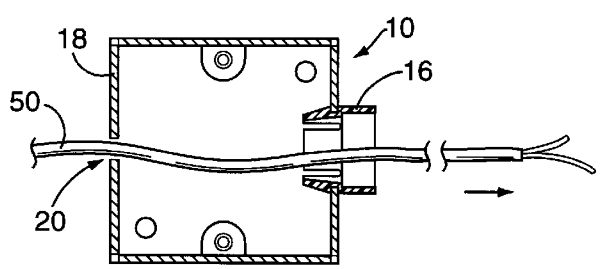
FIGS. 7A and 7B are cross sectional views of the interface box illustrating the method of storing a section of the doorbell wire in the interface box.
Figure 7B:
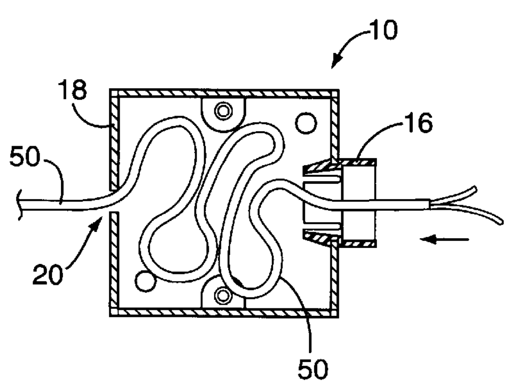

FIGS. 7A and 7B illustrates the method of storing the doorbell wire in the interface box 10. The wire 50 is first passed through the box via the entrance aperture 20 on the rear wall 18 and the plastic neck 16 in the front until a sufficient length of the wire extends from the neck. The section of the wire 50 adjacent the entrance aperture 20 is then held to prevent the wire from escaping from the box via the aperture, and the section of the wire adjacent the neck 16 is pushed into the neck. Because the doorbell wire is relatively thin and flexible, in contrast to the fairly stiff and thick AC power wires, it folds on itself in a serpentine manner when pushed into the box.

The wire 50 is pushed into the box 10 until the desired amount of the wire is stored therein, and the end of the wire is left outside the neck 16 for subsequent connection to a doorbell button.

In certain types of doorbell buttons the switch is disposed on the exterior side of the mounting plate. Such doorbell buttons therefore do not have a cylindrical switch body extending inwardly from the mounting plate. The doorbell button interface box of the present invention, of course, has applicability to those types of doorbell buttons for the purpose of storing the doorbell wire for future use. In view of the foregoing disclosure, the manner in which the interface box is to be used with such doorbell buttons should be clear.

It will be appreciated now that what has been provided is a simple and inexpensive doorbell button interface box that serves multiple purposes. It effectively solves the rather common problem of not having enough doorbell wire available for repairing the degraded doorbell connection by storing a sufficiently long section of the doorbell wire in its interior for future use. The interface box can be mounted directly behind the doorbell button in either a wooden wall or a brick wall. The plastic neck on the front of the box serves as a receptacle for the doorbell switch for protecting the connection thereto. The interface box also serves as a locating means for holding the end of the wire during the construction of the wall on which the doorbell button is mounted.

What is claimed is:

1. In a wall for mounting a doorbell button, a doorbell wiring system comprising:

an interface box having a hollow body and a hollow plastic neck connected to the hollow body, the hollow body sized for mounting inside the wall and having an entrance aperture, the plastic neck sized for receiving a cylindrical body of a doorbell button when the doorbell button is mounted on said wall;

a doorbell wire entering the interface box through the entrance aperture on the hollow body of the interface box, the doorbell wire having an end section for connection to said doorbell button and a spare section adjacent the end section and stored in the hollow body of the interface box in a folded, serpentine manner.

2. A doorbell wiring system as in claim 1, wherein the hollow body of the interface box includes means for mounting in a wooden wall.

3. A doorbell wiring system as in claim 1, wherein the hollow body of the interface box is formed of metal.

4. A doorbell interface box for electrical wiring for a doorbell button mounted on a wall, comprising:

a generally rectangular hollow body sized for mounting inside a wall and having an interior volume for storing a spare section of a doorbell wire in a folded, serpentine, manner, the hollow body further having an entrance aperture for allowing said doorbell wire to enter the hollow body;

a hollow plastic neck connected to a front panel of the hollow body, the plastic neck having an inner diameter dimensioned for receiving a cylindrical body of a doorbell button when the doorbell button is mounted on the wall.

5. A doorbell interface box as in claim 4, wherein the hollow body is formed of metal.

6. A doorbell interface box as in claim 4, wherein the hollow body includes means for mounting the doorbell interface box in a wooden wall.

7. A method of installing electrical wiring for a doorbell button mounted on a wall, comprising:

providing an interface box having a hollow body and hollow plastic neck connected to the hollow body, the hollow body having an entrance aperture;

securing the interface box in the wall with the plastic neck extending toward a surface of the wall;

passing a doorbell wire across the interface box through the entrance aperture and the plastic neck until a spare section of the doorbell wire significantly longer than the interface box extends from the plastic neck;

pushing the spare section of the doorbell wire through the plastic neck back into the hollow body to store the spare section in the hollow body in a folded, serpentine, manner for future uses;

connecting an end of the doorbell wire adjacent the spare section to a doorbell button to form electrical connections on a cylindrical body of the doorbell button; and mounting the doorbell button in the wall with the cylindrical body of the doorbell button received in the plastic neck of the interface box, the elastic neck sized for receiving the cylindrical body of the doorbell button.

8. A method as in claim 7, wherein the wall is formed of bricks, and the step of securing includes mortaring the interface box in the wall.

9. A method as in claim 8, wherein the wall is a wooden wall, and the step of securing includes nailing the interface box to an inside member of the wall.

* * * * *